(12) United States Patent
Sjödin et al.

(10) Patent No.: US 10,323,890 B2
(45) Date of Patent: *Jun. 18, 2019

(54) METHOD FOR JOINING METAL PARTS

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 449 days.

This patent is subject to a terminal disclaimer.

(21) Appl. No.: 14/903,464

(22) PCT Filed: Sep. 10, 2014

(86) PCT No.: PCT/EP2014/069240
§ 371 (c)(1),
(2) Date: Jan. 7, 2016

(87) PCT Pub. No.: WO2015/043945
PCT Pub. Date: Apr. 2, 2015

(65) Prior Publication Data
US 2016/0199931 A1    Jul. 14, 2016

(30) Foreign Application Priority Data

Sep. 26, 2013 (EP) ..................... 13186257

(51) Int. Cl.
*B23K 1/20* (2006.01)
*B23K 1/19* (2006.01)
(Continued)

(52) U.S. Cl.
CPC ............ *F28F 21/081* (2013.01); *B23K 1/008* (2013.01); *B23K 1/0012* (2013.01); *B23K 1/19* (2013.01);
(Continued)

(58) Field of Classification Search
USPC ......................................................... 228/245
See application file for complete search history.

(56) References Cited

U.S. PATENT DOCUMENTS 2,289,365 A   7/1942  Jerabek
4,135,656 A   1/1979  Stern
(Continued)

FOREIGN PATENT DOCUMENTS

CN    2566214 Y    8/2003
CN    1478008 A    2/2004
(Continued)

OTHER PUBLICATIONS

Atlas Steels, "Stainless steel grade chart", Nov. 2000, http://www.atlassteels.com.au/documents/Stainless%20Steel%20Grade%20Composition%20Chart.pdf, accessed Sep. 19, 2018 (Year: 2000).*

(Continued)

*Primary Examiner* — Humera N Sheikh
*Assistant Examiner* — Xiaobei Wang
(74) *Attorney, Agent, or Firm* — Birch, Stewart, Kolasch & Birch, LLP

(57) ABSTRACT

A method for joining a first metal part with a second metal part, the metal parts having a solidus temperature above 1000° C. The method includes applying a melting depressant composition on a surface of the first metal part, the melting depressant composition including a melting depressant component that includes phosphorus and silicon for decreasing a melting temperature of the first metal part; bringing the second metal part into contact with the melting depressant composition at a contact point on said surface; heating the first and second metal parts to a temperature above 1000° C.; and allowing a melted metal layer of the first metal com-
(Continued)

ponent to solidify, such that a joint is obtained at the contact point. The melting depressant composition and related products are also described.

15 Claims, 10 Drawing Sheets

(51) Int. Cl.

| | |
|---|---|
| *B23K 35/22* | (2006.01) |
| *B23K 35/36* | (2006.01) |
| *F28F 21/08* | (2006.01) |
| *C22C 9/00* | (2006.01) |
| *C22C 19/03* | (2006.01) |
| *C22C 19/05* | (2006.01) |
| *C22C 19/07* | (2006.01) |
| *C22C 38/00* | (2006.01) |
| *C22C 38/18* | (2006.01) |
| *C22C 38/40* | (2006.01) |
| *C22C 38/44* | (2006.01) |
| *C22C 38/58* | (2006.01) |
| *F28D 9/00* | (2006.01) |
| *B23K 1/00* | (2006.01) |
| *B23K 1/008* | (2006.01) |
| *B23K 35/365* | (2006.01) |
| *B23K 20/02* | (2006.01) |
| *B23K 20/16* | (2006.01) |
| *B23K 35/00* | (2006.01) |
| *B23K 35/30* | (2006.01) |
| *B23K 35/02* | (2006.01) |
| *F28F 21/00* | (2006.01) |
| *B23K 101/14* | (2006.01) |
| *F28F 3/02* | (2006.01) |

(52) U.S. Cl.
CPC ............... *B23K 1/20* (2013.01); *B23K 1/203* (2013.01); *B23K 20/023* (2013.01); *B23K 20/16* (2013.01); *B23K 35/001* (2013.01); *B23K 35/004* (2013.01); *B23K 35/025* (2013.01); *B23K 35/0222* (2013.01); *B23K 35/3033* (2013.01); *B23K 35/3053* (2013.01); *B23K 35/3601* (2013.01); *B23K 35/365* (2013.01); *B23K 35/3612* (2013.01); *C22C 9/00* (2013.01); *C22C 19/03* (2013.01); *C22C 19/056* (2013.01); *C22C 19/058* (2013.01); *C22C 19/07* (2013.01); *C22C 38/00* (2013.01); *C22C 38/18* (2013.01); *C22C 38/40* (2013.01); *C22C 38/44* (2013.01); *C22C 38/58* (2013.01); *F28D 9/0037* (2013.01); *F28F 21/082* (2013.01); *F28F 21/087* (2013.01); *B23K 2101/14* (2018.08); *F28F 3/025* (2013.01); *F28F 2275/045* (2013.01)

(56) References Cited

U.S. PATENT DOCUMENTS

| | | | |
|---|---|---|---|
| 4,143,258 A | 3/1979 | McCann et al. | |
| 4,313,661 A | 2/1982 | Yamamichi | |
| 6,264,761 B1* | 7/2001 | Hasegawa | B23K 35/0233 148/304 |
| 6,394,179 B1 | 5/2002 | Blomgren et al. | |
| 8,857,699 B2 | 10/2014 | Sjodin et al. | |
| 2004/0056074 A1 | 3/2004 | Sjodin | |
| 2004/0072013 A1 | 4/2004 | Tada | |
| 2004/0184945 A1 | 9/2004 | Sjodin | |
| 2006/0060296 A1 | 3/2006 | Sigler et al. | |
| 2007/0164088 A1 | 7/2007 | Dianatkhah | |
| 2008/0006676 A1 | 1/2008 | Rangaswamy et al. | |
| 2008/0127494 A1 | 6/2008 | Rassmus et al. | |
| 2009/0305078 A1* | 12/2009 | Sjodin | B23K 35/3053 428/656 |
| 2012/0183807 A1 | 7/2012 | Persson | |
| 2013/0084467 A1 | 4/2013 | Sjödin | |
| 2015/0097023 A1 | 4/2015 | Clement | |

FOREIGN PATENT DOCUMENTS

| | | |
|---|---|---|
| CN | 1514758 A | 7/2004 |
| CN | 101100023 A | 1/2008 |
| CN | 101184578 A | 5/2008 |
| CN | 201322570 Y | 10/2009 |
| CN | 102308177 A | 1/2012 |
| CN | 101588890 B | 3/2012 |
| CN | 1474732 B | 4/2012 |
| CN | 102574249 A | 7/2012 |
| EP | 0 508 439 A2 | 10/1992 |
| EP | 0 668 806 B1 | 8/1998 |
| EP | 2 644 312 A1 | 10/2013 |
| FR | 2987570 A1 | 9/2013 |
| GB | 1 256 147 | 12/1971 |
| JP | 8-271175 A | 10/1996 |
| JP | 10-29075 A | 2/1998 |
| JP | 11-287576 A | 10/1999 |
| JP | 2002-539407 A | 11/2002 |
| JP | 2003-48076 A | 2/2003 |
| JP | 2004-529775 A | 9/2004 |
| JP | 2005-940 A | 1/2005 |
| JP | 2005-88062 A | 4/2005 |
| JP | 2010-510067 A | 4/2010 |
| KR | 10-2008-0015871 A | 2/2008 |
| KR | 10-2009-0084942 A | 8/2009 |
| RU | 2 096 150 C1 | 11/1997 |
| RU | 2 167 751 C2 | 5/2001 |
| SU | 659326 A | 4/1979 |
| TW | M298107 U | 9/2006 |
| WO | WO 96/37335 A1 | 11/1996 |
| WO | WO 97/43082 A1 | 11/1997 |
| WO | WO 00/00310 A1 | 1/2000 |
| WO | WO 02/090032 A1 | 11/2002 |
| WO | WO 2006/126953 A1 | 11/2006 |
| WO | WO 2008/060225 A1 | 5/2008 |
| WO | WO 2010/090557 A1 | 8/2010 |
| WO | WO 2012/081346 A1 | 6/2012 |
| WO | WO 2013/144211 A1 | 10/2013 |
| WO | WO 2013/144251 A1 | 10/2013 |
| WO | WO 2014/022625 A1 | 2/2014 |

OTHER PUBLICATIONS

English translation of Korean Office Action, dated Apr. 24, 2017, for Korean Application No. 10-2016-7010585.
English translations of the Russian Office Action and Search Report, dated Jun. 1, 2017, for Russian Application No. 2016106302.
Chinese Office Action and Search Report, dated Sep. 1, 2017, for Chinese Application No. 201480052749.9.
English translations of the Chinese Office Action and Search Report, dated Jul. 31, 2017, for Chinese Application No. 201480052776.6.
English translation of Korean Office Action for Appl. No. 10-2016-7010460 dated Jan. 4, 2018.
English translation of the Taiwanese Office Action and Search Report, dated Jun. 23, 2016, for Taiwanese Application No. 103126724.
English translation of a Korean Office Action issued in Korean Application No. 10-2016-7010473 dated Aug. 25, 2017.
European Office Action dated Aug. 13, 2018 for Application No. 13 186 257.5.
English translation of the Japanese Office Action, dated Mar. 27, 2017, for Japanese Application No. 2016-517375.
Rassmus et al., "Joining aspects on large plate heat exchangers in stainless steel", Proceedings of the 3rd International Brazing and Soldering Conference, Apr. 24-26, 2006, Crowne Plaza Riverwalk Hotel, San Antonio, Texas, USA, XP003028289, pp. 357-362.
English translation of the Chinese Office Action and Search Report issued in Chinese Application No. 201480052777.0 dated May 15, 2017.

(56) References Cited

OTHER PUBLICATIONS

European Office Action, dated Jul. 12, 2016, for European Application No. 13 186 388.8.

* cited by examiner

METHOD FOR JOINING METAL PARTS

TECHNICAL FIELD

The invention relates to a method for joining a first metal part with a second metal part by using a melting depressant composition. The invention also relates to the melting depressant composition and to products that comprise the joined metal parts.

BACKGROUND ART

Today there are different joining methods for joining metal parts (metal objects or metal workpieces) that are made of metallic elements, which metallic elements include various elemental metals as well as various metallic alloys. The metal parts in question have, by virtue of the metallic elements or alloys they are made of, a melting temperature of at least 1000° C., which means that the metal parts cannot be made of e.g. pure aluminum or various aluminum-based alloys. Some examples of metal the metal parts may be made of are typically iron-, nickel- and cobalt-based alloys.

One common method for joining such metal parts is welding which is a method where the metal in the metal part with or without additional material is melted, i.e. a cast product is formed by melting and subsequent re-solidification.

Another joining method is brazing which is a metal-joining process where a filler metal first is applied on at least one of two metal parts to be joined and is then heated above its melting point and distributed between the metal parts by capillary action. The filler metal is typically brought above its melting temperature under protection by a suitable atmosphere. The filler metal flows over the metal parts towards contact points where it forms joints.

Generally, when brazing, a filler metal is applied in contact with a gap or a clearance between the metal parts to be joined. During the heating process the filler metal melts and fills the gap to be joined. In the brazing process there are three major stages where the first stage is called the physical stage. The physical stage includes wetting and flowing of the filler metal. The second stage normally occurs at a given joining temperature. During this stage there is solid-liquid interaction, which is accompanied by substantial mass transfer. A small volume of the metal parts that immediately adjoins the liquid filler metal either dissolves or is reacted with the filler metal in this stage. At the same time a small amount of elements from the liquid phases penetrates into the solid metal parts. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint. The volume of the metal parts that adjoins the liquid filler metal is very small, i.e. the joint is formed to the largest extent by the filler metal. Generally, when brazing, at least 95% of the metal in the joint comes from the filler metal.

Another method for joining two metal parts (parent materials) is transient liquid phase diffusion bonding (TLP bonding) where diffusion occurs when a melting point depressant element from an interlayer moves into lattice and grain boundaries of the metal parts at the bonding temperature. Solid state diffusional processes then lead to a change of composition at the bond interface and the dissimilar interlayer melts at a lower temperature than the parent materials. Thus a thin layer of liquid spreads along the interface to form a joint at a lower temperature than the melting point of either of the metal parts. A reduction in bonding temperature leads to solidification of the melt, and this phase can subsequently be diffused away into the metal parts by holding at bonding temperature for a period of time.

Joining methods such as welding, brazing and TLP-bonding successfully joins metal parts. However, welding has its limitations as it may be very expensive or even impossible create a large number of joints when they are hard to access. Brazing has also its limitations, for example in that it may be hard to properly apply or even determine a most suitable filler metal. TLP-bonding as advantageous when it comes to joining different material but has its limitations. For example, it is often hard to find a suitable interlayer and the method is not really suitable for creating a joint where a large gaps is to be filled or when a relatively large joint is to be formed.

Thus, many factors are involved when selecting a certain joining method. Factors that also are crucial are cost, productivity, safety, process speed and properties of the joint that joins the metal parts as well as properties of the metal parts per se after the joining. Even though the aforementioned methods have their advantages, there is still a need for a joining method to be used as a complement to the present methods, in particular if factors like cost, productivity, safety and process speed are taken into account.

SUMMARY

It is an object of the invention to improve the above techniques and the prior art. In particular, it is an object to provide a method for joining metal parts (metal workpieces, i.e. workpieces or objects that are made of metal) in a simple and reliable manner while still producing a strong joint between the metal parts.

To solve these objects a method of for joining a first metal part with a second metal part is provided. The method is used for metal parts that have a solidus temperature above 1000° C. The method comprises:

applying a melting depressant composition on a surface of the first metal part, the melting depressant composition comprising a melting depressant component that comprises phosphorus and silicon for decreasing a melting point temperature of the first metal part, and optionally, a binder component for facilitating the applying of the melting depressant composition on the surface;

bringing the second metal part into contact with the melting depressant composition at a contact point on said surface;

heating the first and second metal parts to a temperature above 1000° C., said surface of the first metal part thereby melting such that a surface layer of the first metal part melts and, together with the melting depressant component, forms a melted (molten) metal layer that is in contact with the second metal part at the contact point; and allowing the melted metal layer to solidify, such that a joint is obtained at the contact point, the joint comprising at least 50 wt % metal that, before the heating, was part of any of the first metal part and the second metal part.

In one embodiment the joint comprises at least 85 wt % metal that, before the heating, was part of any of the first metal part and the second metal part. This is accomplished by allowing metal of the metal parts to flow to the contact point and form the joint. A joint that is formed in this way is very different from joints that are formed by brazing, since such joints generally comprises at least 90 wt % metal that, before the brazing, was part of a filler metal of the a brazing substance that was used to form the joint.

In one embodiment the melting depressant component comprises at least 8 wt % phosphorus in in another embodiment the melting depressant component comprises at least 14 wt % phosphorus. The melting depressant composition may also be referred to as a melting point depressant composition. The metal in the metal parts may have the form of e.g. iron-, nickel and cobalt-based metallic alloys, as they typically have a solidus temperature above 1000° C. The metal parts may not be pure aluminum or aluminum-based alloys that do not have a solidus temperature above 1000° C. The metal in the metal part or even the metal part per se may be referred to as the "parent metal" or "parent material". In this context, an "iron-based" alloy is an alloy where iron has the largest weight percentage of all elements in the alloy (wt %). The corresponding situation also applies for nickel-, cobalt-, chromium- and aluminum-based alloys.

As indicated, the melting depressant composition comprises at least one component, which is the melting depressant component. Optionally, the melting depressant composition comprises a binder component. All substances or parts of the melting depressant composition that contributes to decreasing a melting temperature of at least the first metal part is considered to be part of the melting depressant component. Parts of the melting depressant composition that are not involved in decreasing a melting temperature of at least the first metal part but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises phosphorus and silicon. If a filer metal is included in the melting depressant composition, it is always part of the melting depressant component.

In this context, "phosphorus and silicon" means the sum of phosphorus and silicon in the melting depressant component, as calculated in wt %. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % phosphorus and silicon means that the total weight of phosphorus and silicon is at least 25 g. in a sample of 100 g melting depressant component. Obviously, if a binder component is comprised in the melting depressant composition, then the wt % of phosphorus and silicon in the melting depressant composition may be less than 25 wt %. However, at least 25 wt % phosphorus and silicon are always present in the melting depressant component, which, as indicated, also includes any filler metal that may be included, i.e. filler metal is always seen as part of the melting depressant composition.

The "phosphorus" includes all phosphorus in the melting depressant component, which includes elemental phosphorus as well as phosphorus in a phosphorus compound. Correspondingly, the "silicon" includes all silicon in the melting depressant component, which includes elemental silicon as well as silicon in a silicon compound. Thus, both the phosphorus and silicon may, in the melting depressant component, be represented by the phosphorus and silicon in various phosphorus and silicon compounds.

Obviously, the melting depressant composition is very different from conventional brazing substances since they have much more filling metal relative melting depressing substances like phosphorus and silicon. Generally, brazing substances have less than 18 wt % phosphorus and silicon.

The method is advantageous in that filler metal may be reduced or even excluded and in that it may be applied for metal parts that are made of different materials. It may also be used within a wide range of applications, for example for joining heat transfer plates or any suitable metal objects that otherwise are joined by e.g. welding or conventional brazing.

Of course, the melting depressant composition may be applied on the second metal part as well.

The phosphorus may originate from any of elemental phosphorus and phosphorus of a phosphorus compound selected from at least any of the following compounds: manganese phosphide, iron phosphide and nickel phosphide. The silicon may originate from any of elemental silicon and silicon of a silicon compound selected from at least any of the following compounds: silicon carbide, silicon boride and ferrosilicon.

The melting depressant component may comprise any of at least 25 wt %, at least 35 wt % and at least 55 wt % phosphorus and silicon. This means that if any filler metal is present it is present in amounts of less than 75 wt %, less than 65 wt % respectively less than 45 wt %.

Phosphorus may constitute at least 10 wt % of the phosphorus and silicon content of the melting depressant compound. This means that, when the melting depressant component comprise at least 25 wt % phosphorus and silicon, then the melting depressant component comprises at least at least 2.5 wt % phosphorus. Silicon may constitute at least 55 wt % of the phosphorus and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition starkly from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements. Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, if the phosphorus comes from the compound manganese phosphide, then the manganese-part of this compound is a metallic element that is included in the metallic elements that in one embodiment should be less than 50 wt % and in the other embodiment less than 10 wt %.

The first metal part may comprise a thickness of 0.3-0.6 mm and the applying of the melting depressant composition may then comprise applying an average of 0.02-1.00 mg phosphorus and silicon per $mm^2$ on the surface of the first metal part. The applying of an average of 0.02-1.00 mg phosphorus and silicon per $mm^2$ on the surface of the first metal part includes any indirect application via e.g. the second metal part, for example phosphorus and silicon that is transferred from the second metal part to the first metal part. Thus, the phosphorus and silicon referred to herein must not necessarily have been applied directly on the first metal part, as long as it still contributes to the melting of the surface layer of the first metal part.

The first metal part may comprise a thickness of 0.6-1.0 mm and the applying of the melting depressant composition may then comprise applying an average of 0.02-1.0 mg phosphorus and silicon per mm² on the surface of the first metal part. As before, the application includes also indirect "application" via the second metal part.

The first metal part may comprise a thickness of more than 1.0 mm and the applying of the melting depressant composition may then comprise applying an average of 0.02-5.0 mg phosphorus and silicon per mm² on the surface of the first metal part.

The surface may have an area that is larger than an area defined by the contact point on said surface part, such that metal in the melted metal layer flows to the contact point when allowing the joint to form. Such flow is typically caused by capillary action.

The area of the surface may be at least 3 times larger than the area defined by the contact point. The area of the surface may be even larger (or the contact point relatively smaller), such as at least 10, 20 or 30 times larger than the area defined by the contact point. The area of the surface refers to the area of the surface from where melted metal flows to form the joint.

The area of the surface may be at least 3 or at least 10 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

Any of the first metal part and the second metal part may comprise a plurality of protrusions that extend towards the other metal part, such that, when bringing the second metal part into contact with said surface, a plurality of contact points are formed on said surface. This is typically the case when the metal parts have the shape of corrugated plates that are stacked and joined to form heat exchangers.

The first metal part may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the first metal part, and the second metal part as well, may be made of a large number of different alloys. Obviously, the examples above are balanced with other metals or elements, as common within the industry.

According to another aspect a product comprising a first metal part that is joined with a second metal part by a joint is provided. The metal parts have a solidus temperature above 1000° C. and the joint comprises at least 50 wt % metallic elements that have been drawn from an area that surrounds the joint and which area was part of any of the first metal part and the second metal part.

According to another aspect a product is provided which comprises a first metal part that is joined with a second metal part according to the method above or any of its embodiments.

According to another aspect a melting depressant composition is provided for, i.e. specifically developed and configured to, joining a first metal part with a second metal part according to the method above or any of its embodiments, the melting depressant composition comprising i) a melting depressant component that comprises and silicon for decreasing a melting temperature, and ii), optionally, a binder component for facilitating applying of the melting depressant composition on the first metal part.

Different objectives, features, aspects and advantages of the method, the products and the melting depressant composition will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
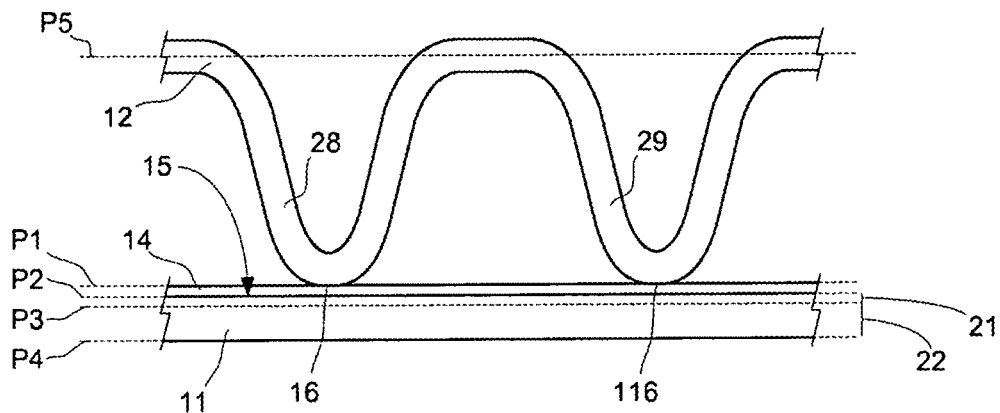
FIG. 1 is a cross-sectional view of a first and a second metal part where a melting depressant composition is applied intermediate the parts.

FIG. 1 shows a first metal part 11 and a second metal part 12 where a melting depressant composition 14 is arranged on a surface 15 of the first metal part 11. The second metal part 12 is, at a contact point 16, in contact with the melting depressant composition 14 on the surface 15. For the illustrated second metal part 12, a first protrusion 28 is in contact with the melting depressant composition 14 at contact point 16 while a second protrusion 29 is in contact with the melting depressant composition 14 at another contact point 116. The first metal part 11 is made of a metallic element, such as an iron-based alloy. More examples of suitable metallic elements the first metal part 11 may be made of are given below. The second metal part 12 is also made of a metallic element, which may be the same metallic element that as the first metal part 11 is made of. In FIG. 1 the first metal part 11 and the second metal part 12 are not yet joined.

Five planes P1-P5 are used for describing how the first metal part 11 and the second metal part 12 are joined. The first plane P1 defines the surface of the melting depressant composition 14. The second plane P2 defines the surface 15 of the first metal part 11, which is an "upper" surface 15 of the first metal part 11. This means that the melting depressant composition 14 has a thickness that corresponds to the distance between the first plane P1 and the second plane P2 (the surface 15). It should be noted that the thickness of the melting depressant composition 14 is greatly exaggerated in the illustrated figures. The real thickness, i.e. the amount of the melting depressant composition 14 on the surface 15 as well as the composition of the melting depressant composition 14, is discussed in detail below.

The third plane P3 defines a surface layer 21 of the first metal part 11, where the surface layer 21 extends from the surface 15 and to the third plane P3 which is located in the first metal part 11. Thus, the thickness of the surface layer 21 corresponds to the distance between the second plane P2 (the surface 15) and the third plane P3. The fourth plane P4 defines a lower surface of the first metal part 11. The thickness of the first metal part 11 corresponds to the distance between the second plane P2 and fourth plane P4. The first metal part 11 has also a lower layer 22, which is a part of the first metal part 11 that does not include the surface layer 21 and which extends from the third plane P3 to the fourth plane P4. The fifth plane P5 defines a base line of the second metal part 12, where the first protrusion 28 and second protrusion 29 protrudes from the base line in a direction towards the first metal part 11.

The illustrated shapes of the first metal part 11 and the second metal part 12 are just exemplifying shapes and other shapes are equally conceivable. For example, the metal parts 11, 12 may have curved shapes, such that the planes P1-P5 do not have the form of flat, two-dimensional surfaces, but instead the form of curved surfaces. In particular planes P2 and P3 must not be sharp lines but may represent gradual transitions.

Figure 2:
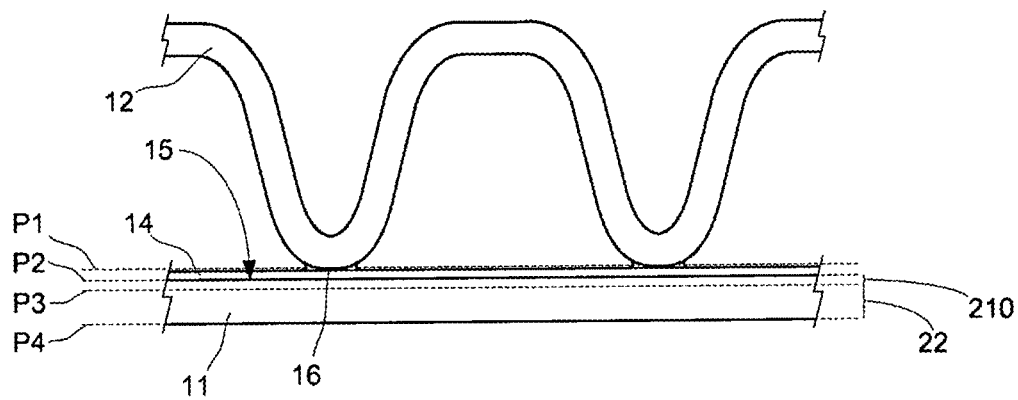
FIG. 2 shows the metal parts of FIG. 1 during heating.

FIG. 2 shows the metal components 11, 12 when they are heated to a temperature above which the melting depressant composition 14 causes the surface layer 21 to melt and form a melted metal layer 210. The temperature is still below a melting temperature of the materials in the first metal part 11 and in the second metal part 12. In brief, when heating the metal parts 11, 12, phosphorous and optionally silicon that is comprised in the melting depressant composition 14 diffuses into the first metal part 11 and causes it to melt at a temperature that is lower than the melting temperature of the material in the first metal part 11 (and of the second metal part 12). The melting depressant composition 14 is applied on the surface 15 at amounts that causes the surface layer 21 to melt and form the melted metal layer 210. Thus, the amount of melting depressant composition 14 is chosen so that phosphorous diffuses only into the surface layer 21 (too much phosphorous might melt the entire first metal part 11). Suitable compositions and amounts of the melting depressant composition 14 are described in the examples below. Metal in the melted metal layer 210 then flows, typically by capillary action, towards the contact point 16 (and to other, similar contact points such as contact point 116).

Figure 3:
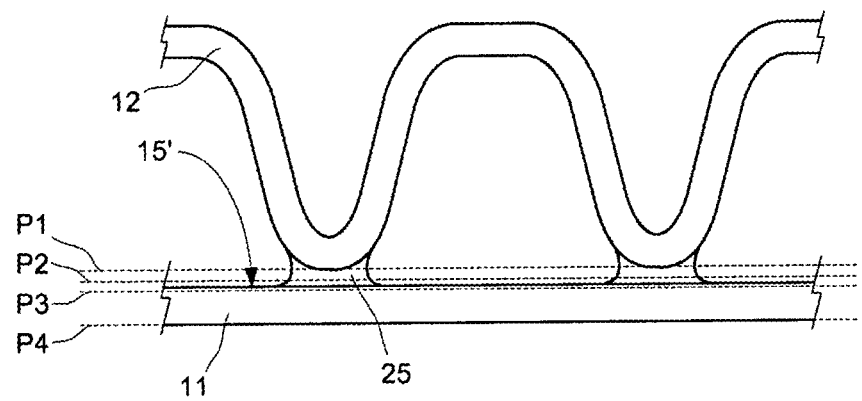
FIG. 3 shows the metal parts of FIG. 1 when a joint is formed.
Figure 4:
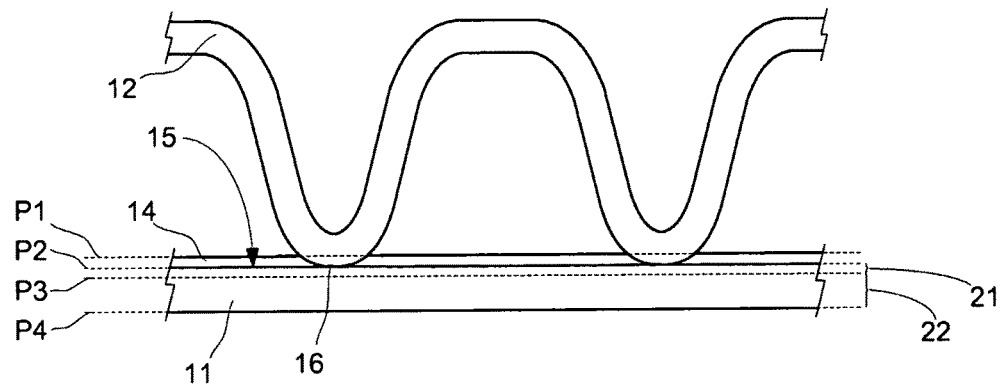
FIG. 4 is a cross-sectional view of a first and a second metal part where a melting depressant composition is applied intermediate the components and when the second metal part abuts the first metal part.
Figure 5:
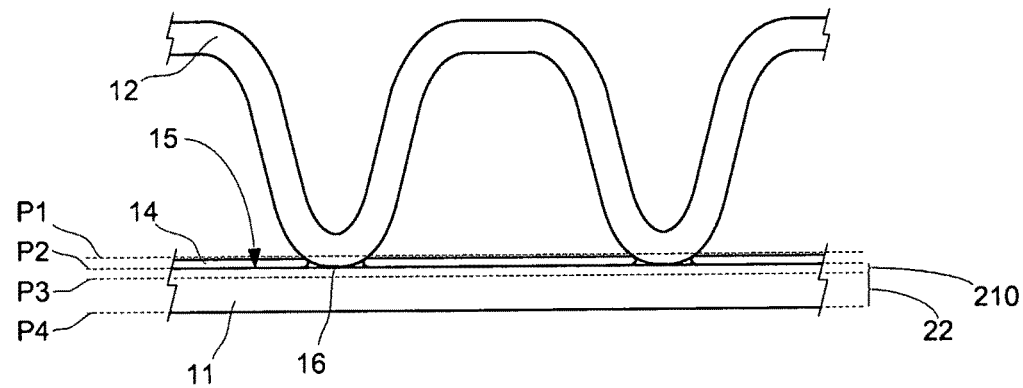
FIG. 5 shows the metal parts of FIG. 4 during heating.

FIG. 3 shows the metal components 11, 12 when all melting depressant composition 14 have diffused into the first metal part 11 and when metal in the melted metal layer 210 has flown towards the contact point 16 where a joint 25 now is formed. The joint now comprises metal that previously was part of the first metal part 11. As may be seen, the melting depressant composition 14 is no longer present on the surface 15 of the first metal part 11 since it has diffused into the first metal part 11 and, typically, to some extent into the second metal part 12. Since the joint 25 is formed from metal from the first metal part 11, the first metal part 11 is now at least locally slightly thinner than before the heating. As may be seen, the first metal part 11 now has an upper surface 15' that is not located at the second plane P2. Instead, the upper surface is now closer to the fourth plane P4. Generally, not all metal in the melted metal layer 210 flows towards the contact point 16 to form the joint 25, but some remains as an upper surface of the first metal part 11 and solidifies there simultaneously with the solidification of the joint 25. The solidification takes place when the temperature is decreased but also prior a decrease of the temperature, e.g. because the phosphorous in the melting depressant composition gradually diffuse into and mix with the material of the first metal part 11. The physical process behind the melting of the metal in the first metal part 11 as well as the subsequent solidification is similar with the melting and solidification process that occur during brazing. However, compared to conventional brazing there is a great difference in that the melting depressant composition 14 comprises no or very small amounts of filler metal; instead of using a filler metal for creating the joint 25, metal from the first metal part 11 is used for creating the joint 25. Optionally, as will be described, metal from the second metal part 12 may be used for creating the joint 25, FIGS. 4-6 corresponds to FIGS. 1-3 with the difference that the second metal part 12 is pressed into the melting depressant composition 14 to such an extent that it is basically in contact with or abuts to the first metal part 11 (some small amounts of the melting depressant composition 14 is still typically present between the metal parts 11, 12).

Figure 6:
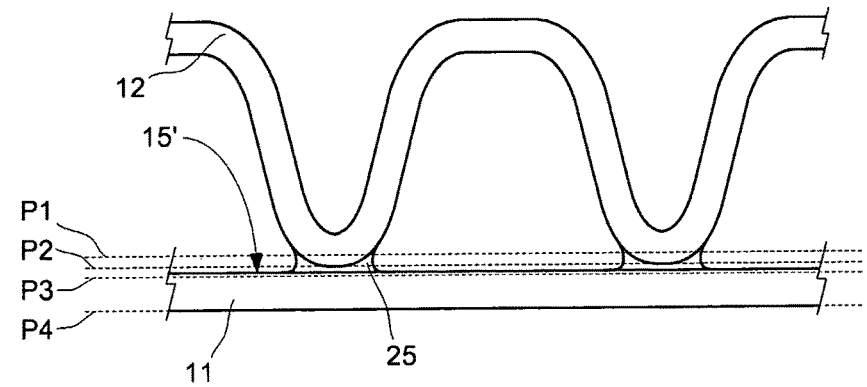
FIG. 6 shows the metal parts of FIG. 4 when a joint is formed.
Figure 7:
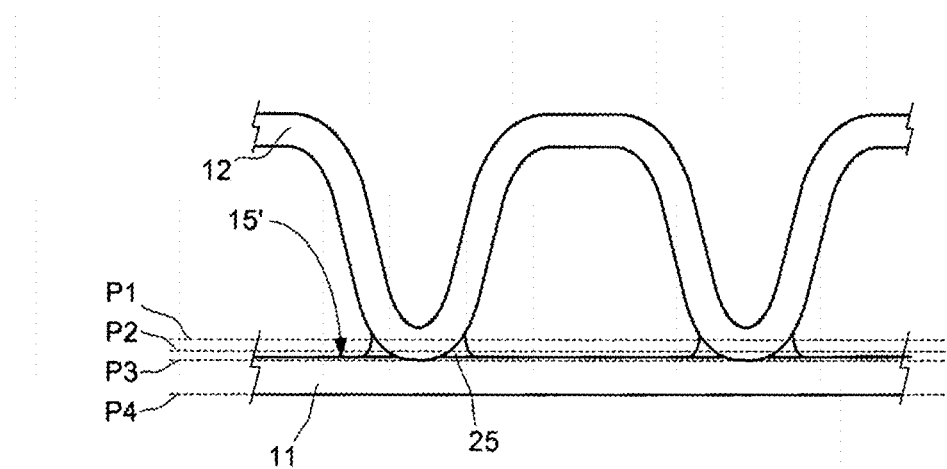
FIG. 7 shows metal parts when a joint is formed and where the parts have been pressed towards each other during the forming of the joint.

FIG. 7 corresponds to FIGS. 3 and 6 with the difference that the first metal part 11 and the second metal part 12 have been pressed towards each other during the forming the joint 25. As a result the second metal part 12 has at the location of the joint 25 "sunk" into the melted metal layer 210 of the first metal part 11.

Figure 8:
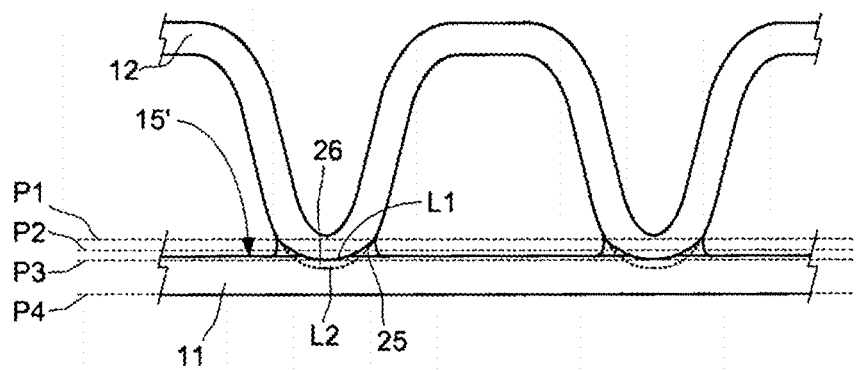
FIG. 8 is a view corresponding to FIG. 7, where material from both metal parts have melted and formed the joint, FIG. 9, corresponds to FIG. 1 and shows distribution of a contact point between the metal parts.

FIG. 8 corresponds to FIG. 7, where material from both the first metal part 11 and the second metal part 12 have melted and formed the joint 25. In practice, this is typically what happens during the forming the joint 25, especially if the first metal part 11 and the second metal part 12 are made of the same material, since the second metal part 12 also is in contact with the melting depressant composition.

Before the heating the second metal part 12 has an outer contour defined by line L2. During heating, a surface layer of the second metal part 12 forms a melted surface layer, where the metal of this layer flows to the contact point 16 and forms a joint 25 there. The melted surface layer of the second metal part 12 is represented by the layer between line L2 and line L1, where line L1 defines a boundary where the metal of the second metal part 12 has not been melted.

It should be noted that there is no real sharp boundary between metal of the first metal part 11 and the second metal part 12 that is melted respectively is not melted. Instead, there is a gradual transition from "melted" to "not melted".

Figure 9:
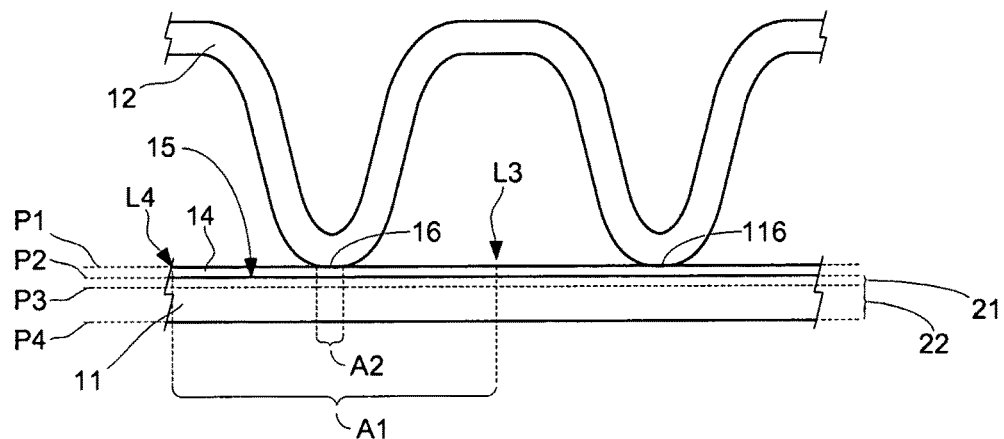
Figure 10:
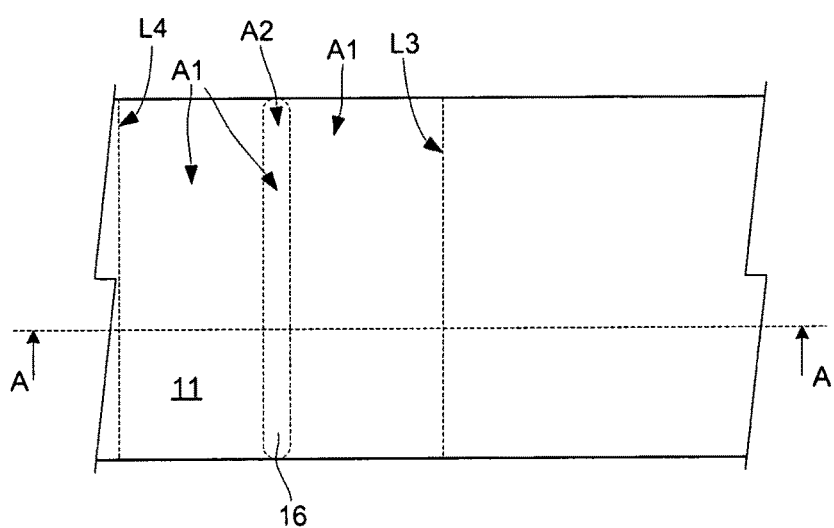
FIG. 10 shows an area of the contact point between the metal parts, FIG. 11, corresponds to FIG. 3 and shows distribution of a joint between the metal parts.

FIG. 9 corresponds to FIG. 1 and shows a distribution of the contact point 16 between the first metal part 11 and the second metal part 12. FIG. 10 shows the same metal parts 11, 12 but from above and in the first plane P1. FIG. 9 is a cross-sectional view as seen along line A-A in FIG. 10.

As may be seen, the contact point 16 has a distribution over the melting depressant composition 14 on the first metal part 11 that is significantly larger than a distribution of the melting depressant composition 14 on the surface 15. The distribution of the contact point 16 has an area A2 that is significantly smaller than an area A1 of the melting depressant composition 14 on the surface 15. The area A1 comprises the area the A2. The area A1 extends between two lines L3, L4 that are located at a respective side of the contact point 16. Line L3 is located between the contact point 16 and the other contact point 116, since melted metal of the first metal part 11 generally flows towards the closest contact point. The area A1 of the surface 15 on which the melting depressant composition 14 is applied is at least 10 times larger than the area A2 defined by the contact point 16. The area A1 may be defined as an area of the surface 15 on which melting depressant composition 14 is applied and from which area A1 metal is drawn to the form the joint 25. The area A2 may be defined as the area of the contact point 16, i.e. the area of contact between the melting depressant composition 14 and the second metal part 12, optionally including an area of contact (if any) between the first metal part 11 and the second metal part 12 at the contact point 16. The area A1 is generally at least 10 times larger than the area A2.

Figure 11:
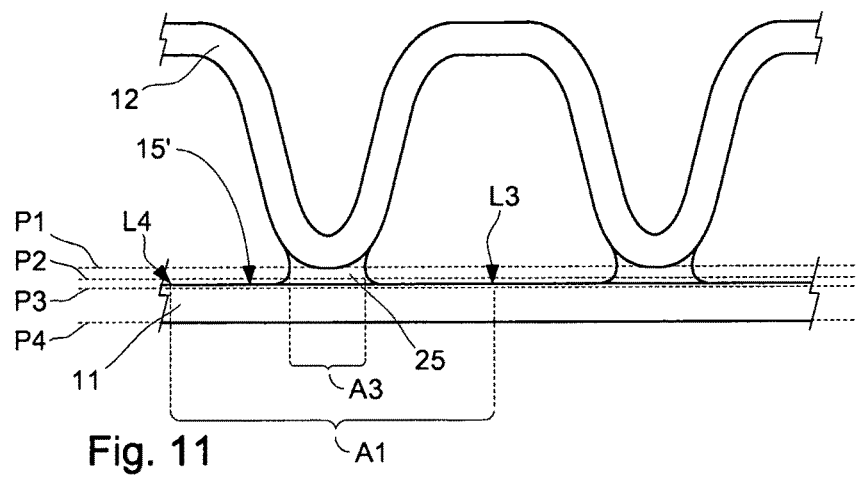
Figure 12:
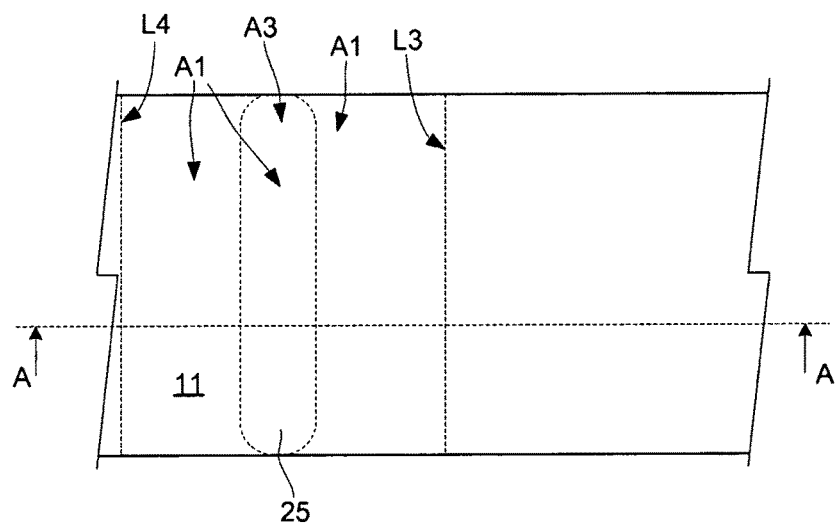
FIG. 12 shows a cross-sectional area of the joint.

FIG. 11 corresponds to FIG. 3 and shows a cross-sectional area A3 of the joint 25. The area A1 of the surface 15 on which the melting depressant composition 14 is applied is at least 3 times larger than the cross-sectional area A3 of the joint 25. FIG. 12 shows the same metal parts 11, 12 but from above and in the second plane P2. FIG. 11 is a cross-sectional view as seen along line A-A in FIG. 12.

As may be seen, the joint 25 has a cross-sectional are A3 that is significantly smaller than the area A1 of the melting depressant composition 14 on the surface 15. As before, the area A1 may be defined as an area of the surface 15 on which melting depressant composition 14 is applied and from which area A1 metal is drawn to form the joint 25. The cross-sectional area A3 of the joint 25 may be defined as the smallest area the joint 25 has between the first metal part 11 and the second metal part 12. The cross-sectional area A3 may have the shape of a curved surface. Obviously, the areas A1 and A2 may have the shape of curved surfaces, depending on the respective shape of the first metal part 11 and the second metal part 12.

Depending on the shape of the metal parts to be joined the area on which the melting depressant composition is applied may be substantially equal to the area of a joint that is subsequently formed.

A number of experiments and examples are now presented for describing suitable materials for the first metal part 11, the second metal part 12, the composition of the melting depressant composition 14, which amounts of melting depressant composition 14 should be used, suitable temperatures for the heating, for how long heating shall be done etc. Thus, the results of these experiments and examples are used for previously described entities like the first metal part 11, the second metal part 12, the melting depressant composition 14, the contact point 16, the joint 25 etc., i.e. all previously described entities may incorporate the respectively related features described in connection with the experiments and examples below. In the following the melting depressant composition is referred to as a "blend". Metal part may be referred to as "parent metal".

A number of suitable melting depressant compositions, i.e. melting point temperature depressant compositions, have been tested. The active component in the melting depressant composition is phosphorous (P). Compounds of phosphorous have been selected as the source for phosphorous. The compounds include $Fe_3P$, NiP and $Mn_3P_2$, where $Mn_3P_2$ is a mixture of MnP and $Mn_2P$. Other compounds that include phosphorous may be used just as well—they only have to be verified in respect of their usefulness and in respect of the result they provide, in a similar manner as done for the for $Fe_3P$, NiP and $Mn_3P_2$ and outlined below.

The $Fe_3P$, also called iron phosphide, is a conventional compound that was obtained from the company Alfa Aesar, with a CAS (Chemical Abstracts Service) number of 12023-53-9 and MDL (Molecular Design Limited) number of MFCD00799762.

The $Mn_3P_2$, also called manganese phosphide, is a conventional compound that was obtained from the company Alfa Aesar, with a CAS (Chemical Abstracts Service) number of 12263-33-1 and MDL (Molecular Design Limited) number of MFCD00064736.

The NiP, also called nickel phosphorus, is a conventional compound that was plated on a metal part to be joined. The metal part to be joined is also referred to as a base metal or base material, The plating was done by performing a conventional nickel phosphorus plating method, as done by, for example, the company Brink Förnicklingsfabriken AB in Norrköping, Sweden For some the of the examples Si, or Silicon, was used. The silicon is a conventional compound that was obtained from the company Alfa Aesar, is referred to as "silicon powder, crystalline, −325 mesh, 99.5% (metals basis)", with CAS 7440-21-3 and MDL MFCD00085311.

When looking on the atomic compositions of compounds, by applying the atomic weights and by using conventional calculation techniques it may be determined that $Fe_3P$ comprises 16 wt % P (phosphorous) and $Mn_3P_2$ comprises 27 wt % P. When nickel plating, approximately 11-14 wt % P are comprised in the NiP layer.

A binder was used for applying the $Fe_3P$ and the $Mn_3P_2$ on metal parts to be joined. The binder (polymeric and solvent) is a binder sold by Wall Colmonoy under the name of Nicorobraz S-20 (S-20). A sample of the binder was placed on a metal plate and dried at 22° C. for 24 h. The weight of the sample was 0.56 g before drying and 0.02 g after drying. Thus, 3.57 wt % of the binder are components that remain after drying. A melting depressant composition was prepared where $Mn_3P_2$ and Si form a melting depressant component (melting point temperature depressant component) and where were the binder S-20 form a binder component. The preparation was done by first mixing $Mn_3P_2$ with Si and then by adding and mixing the binder S-20. Two variants of the melting depressant composition with different amounts of Si was prepared, referred to as $A1Mn_3P_2$ (A1) and $B1Mn_3P_2$ (B1), as shown in table 1.

TABLE 1

| X: | A1 $Mn_3P_2$ | B1 $Mn_3P_2$ |
|---|---|---|
| X: | 10.00 g | 10.00 g |
| Si | 4.07 g | 6.15 g |
| Sum X and Si | 14.07 g | 16.15 g |
| X:Si | 2.46:1 | 1.63:1 |
| S-20 | 16.80 g | 15.98 g |
| Tot sum | 30.87 g | 32.13 g |

The compositions A1 and A2 were applied on flat, circular test pieces of stainless steel type 316 L (SAE steel grade) and with a diameter of 42 mm in diameter.

Figure 13:
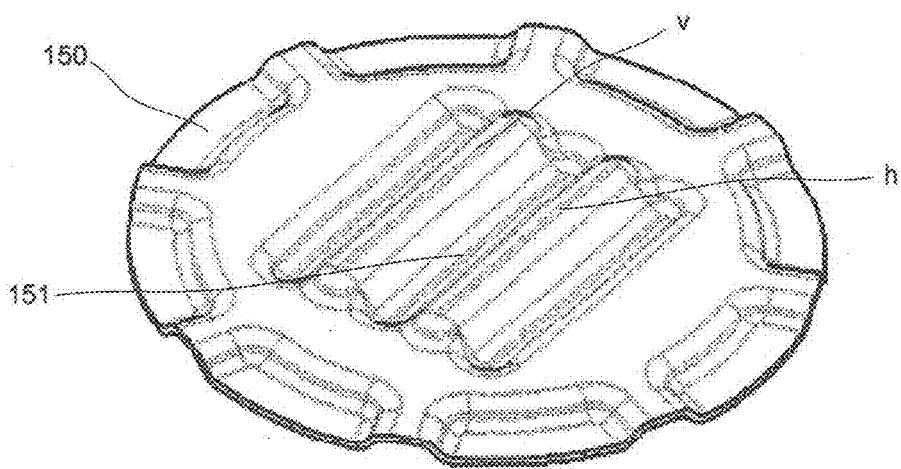
FIG. 13 shows a pressed plate that is used in a number of examples that described how two metal parts may be joined.

On every test piece another piece of a different material, 254 SMO (SAE steel grade), was placed. This other piece is shown in FIG. 13 and has the form of a circular, pressed plate 150, which is 42 mm in diameter and has a thickness of 0.4 mm The pressed plate 150 has two pressed beams v and h, each approximately 20 mm long. When the piece with the beams was placed on the flat piece, contact points were formed where the beams of piece 150 abut the other, flat piece.

The pieces, i.e. that flat circular piece and the pressed plate, are referred to as a sample, and several samples were heat treated for 2 hours in vacuum at different temperatures for each sample. Table 2 shows which amounts of the compositions that were used for the samples.

For samples A1:1 to A1:3 and samples B1:1 to B1:3 the heat treatment comprised holding the samples in a temperature of 1120° C. for 2 hours at vacuum.

For samples A1:4 to A1:6 and samples B1:4 to B1:6 the heat treatment comprised holding the samples in a temperature of 1140° C. for 2 hours at vacuum.

A1 indicates composition A1 $Mn_3P_2$ while B2 indicates composition B1 $Mn_3P_2$. The numbers after A1 respectively B2 indicates different samples, as presented in Table 2. In this table is the weight of the sample is presented, which includes the weight of the melting depressant component and the weight of the dry binder component.

TABLE 2

| Sample | Dry binder + melting depressant component (g) |
|---|---|
| A1:1 | 0.22 |
| A1:2 | 0.13 |
| A1:3 | 0.14 |
| A1:4 | 0.33 |
| A1:5 | 0.1 |
| A1:6 | 0.16 |
| B1:1 | 0.19 |
| B1:2 | 0.09 |
| B1:3 | 0.16 |
| B1:4 | 0.16 |
| B1:5 | 0.34 |
| B1:6 | 0.14 |

Figure 14:
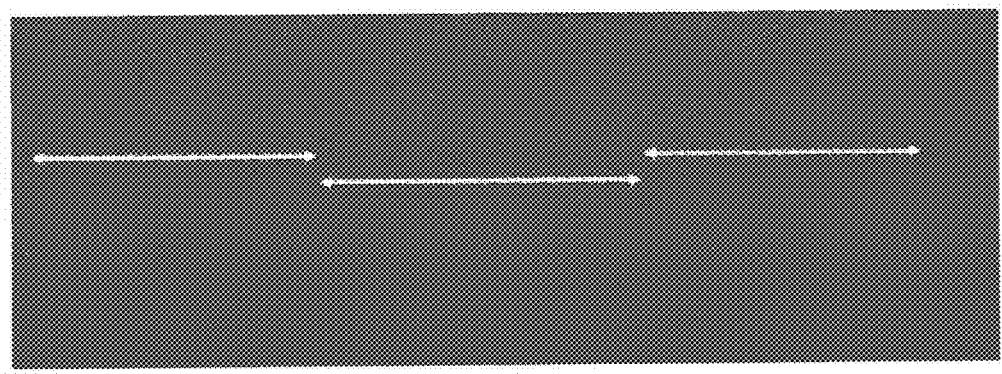
FIG. 14 is a photo of a cross-section of a joint between the plate shown in FIG. 13 and a flat plate.
Figure 15:
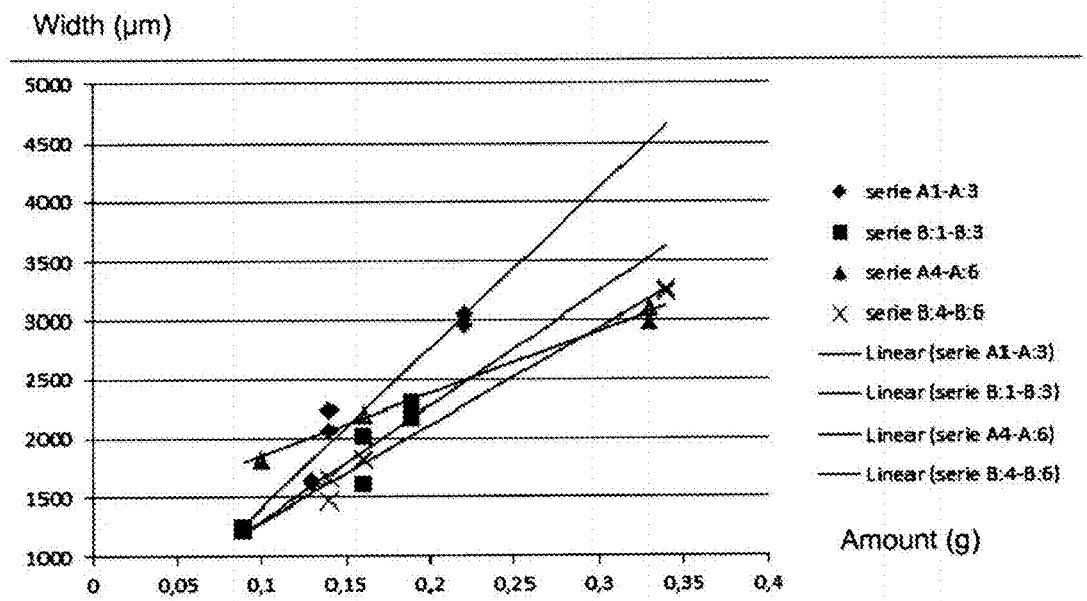
FIG. 15 shows a diagram where a measured joint width is plotted as a function of an applied amount of melting depressant composition, including trend lines.

After the heat treatment the samples were allowed to cool to a room temperature (22° C.) and it was observed that the two pieces of the sample were joined along the lengths of the beams of the pressed plate 150, i.e. the sample has joints along the beams. The samples were cut across the joints at two sections and each joint was measured at its broadest section X, which is illustrated in FIG. 14. The results are presented in Table 3 and illustrated in the diagram of FIG. 15, where the width of the joint is plotted as a function of the applied amount of melting depressant composition.

TABLE 3

| Sample | applied amount (g) | width (μm) |
|---|---|---|
| A1-2 | 0.13 | 1640 |
| A1-2 | 0.13 | 1610 |
| A1-3 | 0.14 | 2070 |
| A1-3 | 0.14 | 2240 |
| A1-1 | 0.22 | 2961 |
| A1-1 | 0.22 | 3050 |
| B1-2 | 0.09 | 1240 |
| B1-2 | 0.09 | 1220 |
| B1-3 | 0.16 | 2010 |
| B1-3 | 0.16 | 1600 |
| B1-1 | 0.19 | 2170 |
| B1-1 | 0.19 | 2290 |
| A1-5 | 0.1 | 1831.9 |
| A1-5 | 0.1 | 1810.1 |
| A1-6 | 0.16 | 2195.01 |
| A1-6 | 0.16 | 2202.28 |
| A1-4 | 0.33 | 3107.34 |
| A1-4 | 0.33 | 2993.13 |
| B1-6 | 0.14 | 1470.32 |
| B1-6 | 0.14 | 1661.94 |
| B1-4 | 0.16 | 1832.65 |
| B1-4 | 0.16 | 1810.9 |
| B1-5 | 0.34 | 3264.29 |
| B1-5 | 0.34 | 3237.96 |

Figure 16:
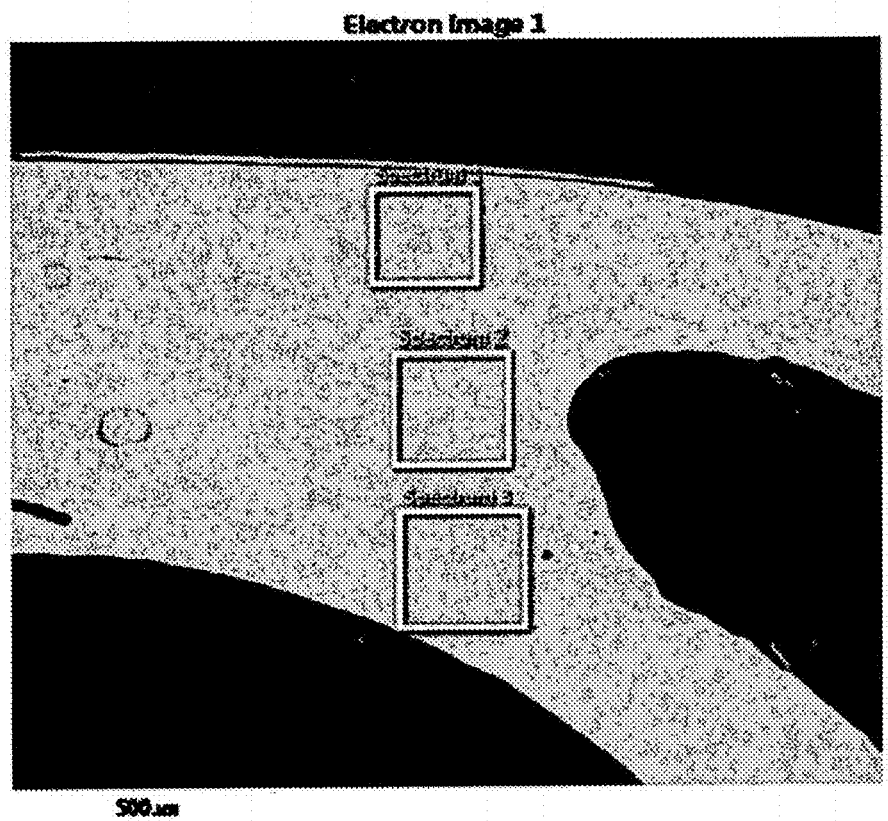
FIGS. 16-20 show a cross section of a joint investigated in an SEM, (scanning electron microscope), and locations of electron scanning,)))

Metallurgical investigations were then made for the joints. This was done by analyzing the cut cross sections of the joints in a so called SEM-EDX, which is a conventional and commercially available scanning electron microscope with X-ray detector. FIG. 16 illustrates the locations of three measurements for sample A1-6 and Table 4 shows the results of the measurements.

TABLE 4

| Spectrum Label (chemical substance) | Spectrum 1 | Spectrum 2 | Spectrum 3 |
|---|---|---|---|
| C | 3.04 | 2.86 | 2.95 |
| Si | 0.40 | 2.40 | 1.52 |
| P | — | 1.43 | 0.76 |
| Cr | 16.11 | 18.00 | 17.33 |
| Mn | 1.50 | 1.63 | 1.35 |
| Fe | 62.90 | 50.54 | 51.15 |
| Ni | 13.88 | 18.00 | 20.76 |
| Mo | 2.17 | 5.16 | 4.17 |
| Total | 100.00 | 100.00 | 100.00 |

The investigations shows that the joints comprise at least 90 wt % metal that, before the heating, was part of any of the first metal part and the second metal part, i.e. the pieces of the sample. This is readily determined since Mn and P together represent less than 2.2 wt %.

Figure 17:
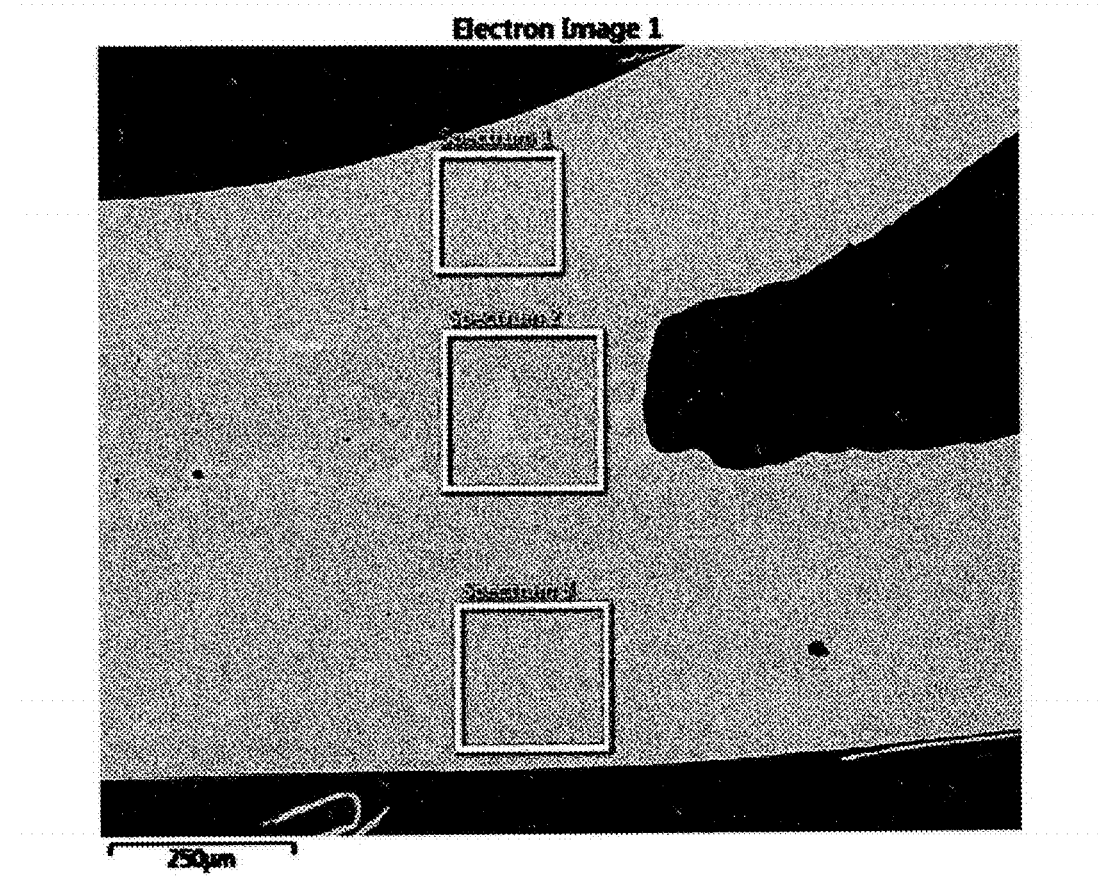

Similar investigations were also made for sample B1-6. FIG. 17 illustrates the locations of three measurements for sample B1-6 and Table 5 shows the results of the measurements.

TABLE 5

| Spectrum Label (chemical substance) | Spectrum 1 | Spectrum 2 | Spectrum 3 |
|---|---|---|---|
| C | 2.87 | 2.86 | 2.77 |
| Si | 0.43 | 2.58 | 0.42 |
| P | 0.17 | 1.76 | |
| Cr | 18.75 | 16.72 | 16.61 |
| Mn | 0.00 | 2.41 | 1.46 |
| Fe | 50.56 | 50.18 | 63.19 |
| Ni | 21.70 | 18.90 | 13.63 |
| Mo | 5.53 | 4.58 | 1.91 |
| Total | 100.00 | 100.00 | 100.00 |

Investigations shows that the joints comprises at least 90 wt % metal that, before the heating, was part of any of the first metal part and the second metal part, i.e. the pieces of the sample. This is readily determined since Mn and P together represent less than 4.2 wt %, In a next test pieces of type 316 stainless steel, referred to as 316, with a diameter of 42 mm were applied with three different melting depressant compositions (one composition on a respective piece): i) $Mn_3P_2$, ii) NiP plated on 316 and iii) NiP plated on 316 together with Si as melting point depressants. The thickness of the plated NiP is 50 μm. 0.15 g Si was applied by conventional painting. On every piece a pressed piece similar to that of FIG. 13 of type 254 SMO was placed. The pieces form samples that were heat treated for 2 hours in vacuum at 1120° C. Joints were formed between the pieces.

Figure 18:
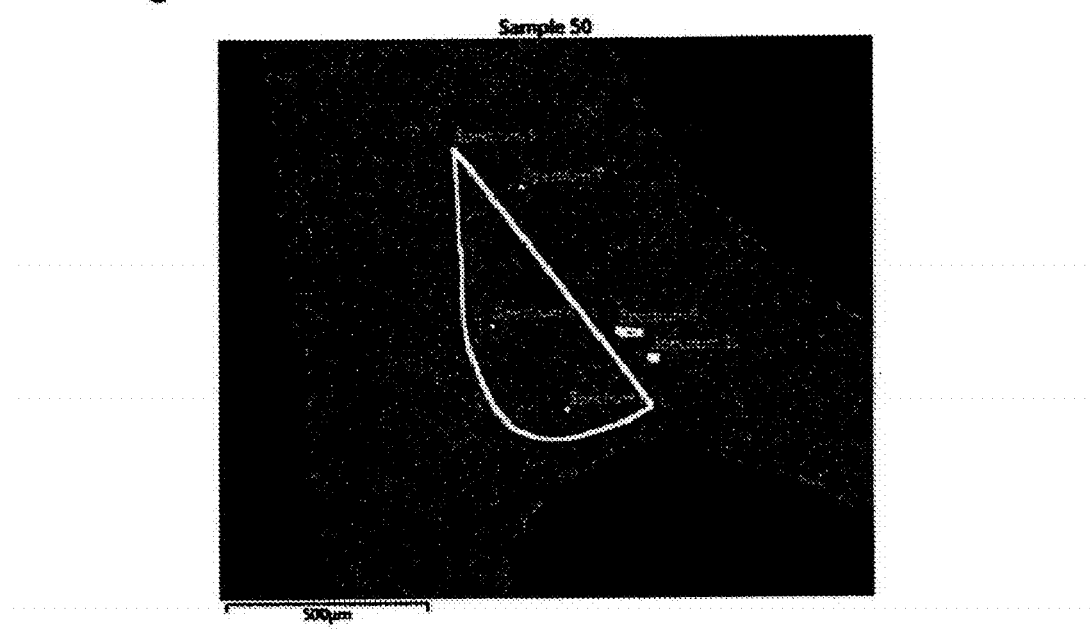

Table 6 shows an analysis of a cut cross section of the joints by using SEM-EDX for the sample with 50 μm NiP plating. From the result it appears that the joint comprises at least 20 wt % metal that, before the heating, was part of any of the piece (first metal part) or second piece (second metal part). FIG. 18 shows the location of the measurements in the joint.

TABLE 6

| Spectrum Label (chemical substance) | Spectrum 10 | Spectrum 5 | Spectrum 6 | Spectrum 7 | Spectrum 8 | Spectrum 9 |
|---|---|---|---|---|---|---|
| O | 0.91 | 1.48 | 0.67 | 1.20 | 0.99 | 2.34 |
| Si | 0.32 | 0.26 | 0.29 | — | 0.18 | — |
| P | 1.07 | 9.60 | 0.95 | 14.41 | 1.06 | 10.84 |
| Cr | 7.42 | 8.83 | 7.64 | 17.99 | 7.78 | 13.27 |
| Mn | — | 0.61 | — | 0.51 | — | 0.43 |
| Fe | 33.22 | 23.11 | 33.69 | 20.17 | 33.60 | 23.03 |
| Ni | 56.01 | 54.25 | 55.61 | 40.95 | 55.06 | 46.83 |
| Mo | 1.06 | 1.86 | 1.16 | 4.77 | 1.33 | 3.25 |
| Total | 100.00 | 100.00 | 100.00 | 100.00 | 100.00 | 100.00 |

Figure 19:
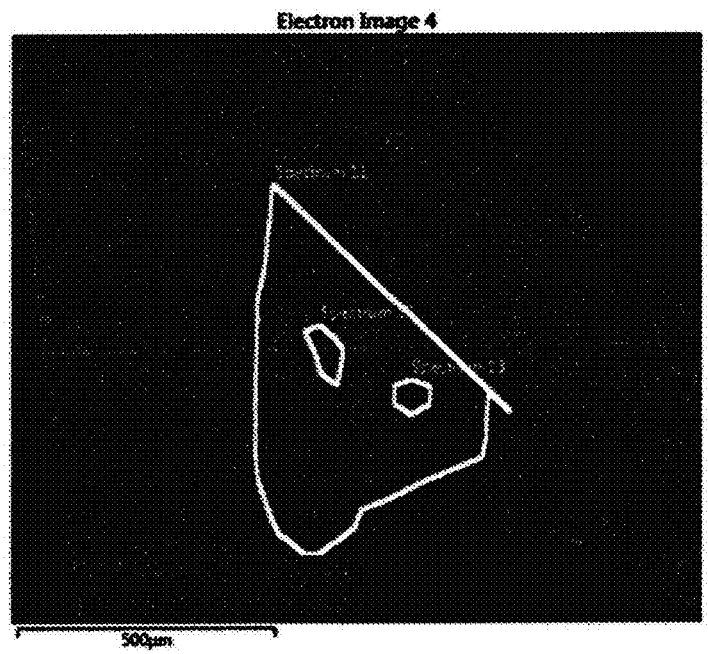

Table 7 shows an analyze of a cut cross section of the joints by using SEM-EDX for the sample with 50 μm NiP plating where app 0.15 g amount of Si has been applied (painted) on the plated surface. From the result it appears that the joint comprises more metal in comparison with the test where no Si was used. A higher amount of Si would most likely increase the amount of metal in the joint that comes from the test pieces. FIG. 19 shows the location of the measurements in the joint.

TABLE 7

| Spectrum Label (chemical substance) | Spectrum 11 | Spectrum 12 | Spectrum 13 |
|---|---|---|---|
| C | 7.44 | 6.41 | 6.34 |
| O | 1.48 | 1.71 | 1.06 |
| Si | 2.22 | 1.99 | 2.43 |
| P | 5.76 | 8.83 | 0.48 |
| Cr | 11.13 | 12.33 | 9.47 |
| Mn | 0.39 | 0.51 | 0.00 |
| Fe | 30.33 | 26.57 | 38.80 |
| Ni | 38.70 | 38.19 | 40.10 |
| Mo | 2.54 | 3.46 | 1.33 |
| Total | 100.00 | 100.00 | 100.00 |

Figure 20:
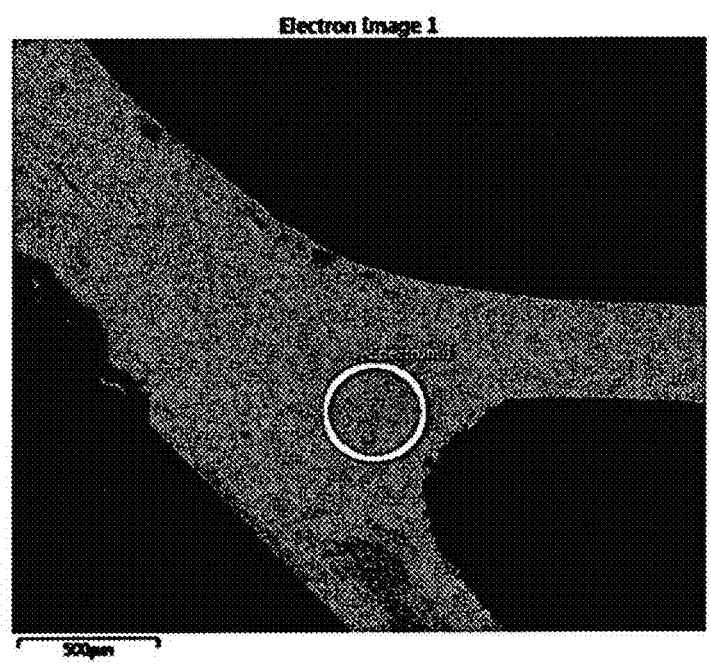

Table 8 shows an analysis of a cut cross section of the joints by using SEM-EDX for the sample with $Mn_3P_2$. The $Mn_3P_2$ has been mixed 50 wt:50 wt with S-20 binder but no Si is used. An amount of 0.2 g (after drying of the binder component) was applied. From the result it appears that the joint comprises at least 80 wt % metal that before the joining was part of the products that were joined. FIG. 20 shows the location of the spectrum 1 measurements in the joint.

TABLE 8

| Spectrum Label (chemical substance) | Spectrum 1 | Spectrum 2 |
|---|---|---|
| O | — | 2.28 |
| Si | 0.29 | 0.31 |
| P | 6.33 | 7.23 |
| S | — | 0.54 |
| Cr | 21.70 | 22.65 |
| Mn | 1.08 | 1.40 |
| Fe | 51.93 | 46.63 |
| Ni | 12.02 | 12.19 |
| Mo | 6.65 | 6.78 |
| Total | 100.00 | 100.00 |

Method

Figure 21:
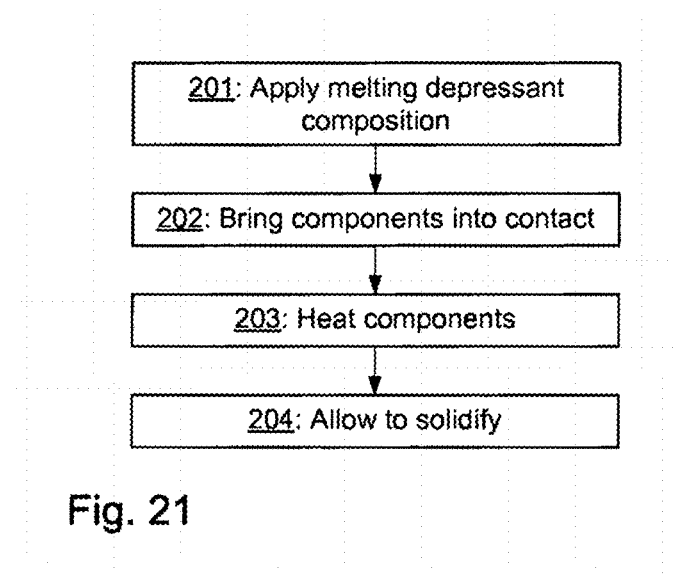
FIG. 21 is a flow chart of a method for joining a first and second metal part.

With reference to FIG. 21 a flow chart of a method for joining a first and second metal part is illustrated. The metal parts may be made of different materials as described above.

In a first step 201 the melting depressant composition is applied on the surface of one of the metal parts (here the first metal part). The application per se may be done by conventional techniques, e.g. by spraying or painting in case the melting depressant composition comprises a binder component, and by PVD or CVD in case not binder component is used.

A next step 202 the second metal part is brought into contact with the melting depressant composition at a contact point on the surface. This can be done manually or automatically by employing conventional, automated manufacturing systems.

In a next step 303 the metal parts are heated to a temperature which is above 1000° C. The exact temperature can be found the examples above. During the heating a surface of at least the first metal part melt and, together with the melting depressant component, forms a melted metal layer that is in contact with the second metal part at the contact point between the first metal part and the second metal part. When this happens, metal of the melted metal layer flows towards the contact point.

A final step 204 the melted metal layer is allowed to solidify, such that a joint is obtained at the contact point, i.e. the metal that has flown to the contact point solidifies. The solidification typically includes decreasing temperature to normal room temperature. However, solidification also occurs during the physical process of redistribution of components (phosphorous and optionally silicon) in the joint area, before a temperature is decreased.

From the description above follows that, although various embodiments of the invention have been described and shown, the invention is not restricted thereto, but may also be embodied in other ways within the scope of the subject-matter defined in the following claims. Various melting depressant compositions can also be combined with various metals for the metal parts.

The invention claimed is:

1. A method for joining a first metal part with a second metal part, the metal parts having a solidus temperature above 1000° C., the method comprising the steps of:
   applying a melting depressant composition on a surface of the first metal part, the melting depressant composition comprising:
      a melting depressant component that comprises phosphorus and silicon for decreasing a melting temperature of the first metal part; and
      optionally, a binder component for facilitating the applying of the melting depressant composition on the surface;
   bringing the second metal part into contact with the melting depressant composition at a contact point on said surface;
   heating the first and second metal parts to a temperature above 1000° C., said surface of the first metal part thereby melting such that a surface layer of the first metal part melts and, together with the melting depressant component, forms a melted metal layer that is in contact with the second metal part at the contact point; and
   allowing the melted metal layer to solidify and form a joint at the contact point, the joint comprising at least 50 wt % metal that, before the heating, was part of any of the first metal part and the second metal part,
   wherein the melting depressant component comprises less than 10 wt % metallic elements.

2. The method according to claim 1, wherein the phosphorus originates from a phosphorus compound selected from at least any of the following compounds: $Mn_xP_y$, $Fe_xP_y$ and $Ni_xP_y$.

3. The method according to claim 1, wherein the silicon originates from any of elemental silicon and silicon of a silicon compound selected from at least any of the following compounds: silicon carbide, silicon boride and ferrosilicon.

4. The method according to claim 1, wherein the melting depressant component comprises any of at least 25 wt %, at least 35 wt % and at least 55 wt % phosphorus and silicon.

5. The method according to claim 1, wherein phosphorus constitutes at least 10 wt % of the phosphorus and silicon content of the melting depressant compound.

6. The method according to claim 1, wherein silicon constitutes at least 55 wt % of the phosphorus and silicon content of the melting depressant compound.

7. The method according to claim 1, wherein the first metal part comprises a thickness of 0.3-0.6 mm and the applying of the melting depressant composition comprises applying an average of 0.02-1.00 mg phosphorus and silicon per $mm^2$ on the surface of the first metal part.

8. The method according to claim 1, wherein the first metal part comprises a thickness of 0.6-1.0 mm and the applying the melting depressant composition comprises applying an average of 0.02-2.0 mg phosphorus and silicon per $mm^2$ on the surface of the first metal part.

9. The method according to claim 1, wherein the surface has an area that is larger than an area defined by the contact point on said surface, such that metal in the melted metal layer flows to the contact point when allowing the joint to form.

10. The method according to claim 9, wherein the area of the surface is at least 3 times larger than the area defined by the contact point.

11. The method according to claim 9, wherein the area of the surface is at least 10 times larger than a cross-sectional area of the joint.

12. The method according to claim 1, wherein any of the first metal part and the second metal part comprises a plurality of protrusions that extend towards the other metal part, such that, when bringing the second metal part into contact with said surface, a plurality of contact points are formed on said surface.

13. The method according to claim 1, wherein the first metal part comprises one of:
   >50 wt % Fe, <13 wt % Cr, <1 wt % Mo, <1 wt % Ni and <3 wt % Mn,
   >90 wt % Fe,
   >65 wt % Fe and >13 wt % Cr,
   >50 wt % Fe, >15.5 wt % Cr and >6 wt % Ni,
   >50 wt % Fe, >15.5 wt % Cr, 1-10 wt % Mo and >8 wt % Ni,
   >97 wt % Ni,
   >10 wt % Cr and >60 wt % Ni,
   >15 wt % Cr, >10 wt % Mo and >50 wt % Ni,
   >70 wt % Co,
   >80 wt % Cu, and
   >10 wt % Fe, 0.1-30 wt % Mo, 0.1-30 wt % Ni and >50 wt % Co.

14. The method according to claim 2, wherein the silicon originates from any of elemental silicon and silicon of a silicon compound selected from at least any of the following compounds: silicon carbide, silicon boride and ferrosilicon.

15. The method according to claim 2, wherein the melting depressant component comprises any of at least 25 wt %, at least 35 wt % and at least 55 wt % phosphorus and silicon.

* * * * *